(12) United States Patent
Oakley

(10) Patent No.: US 6,744,719 B2
(45) Date of Patent: Jun. 1, 2004

(54) METHOD AND APPARATUS FOR OPTICAL TRACKING IN AN EDGE-GUIDED TAPE RECORDER

(75) Inventor: William S. Oakley, Burlingame, CA (US)

(73) Assignee: Imation Corp., Oakdale, MN (US)

(*) Notice: Subject to any disclaimer, the term of this patent is extended or adjusted under 35 U.S.C. 154(b) by 133 days.

(21) Appl. No.: 10/096,092

(22) Filed: Mar. 8, 2002

(65) Prior Publication Data
US 2002/0181382 A1 Dec. 5, 2002

Related U.S. Application Data
(60) Provisional application No. 60/274,439, filed on Mar. 9, 2001.

(51) Int. Cl.[7] .................................................. G11B 7/00
(52) U.S. Cl. ...................................... 369/97; 369/44.17
(58) Field of Search ........................... 369/44.11, 44.12, 369/44.14, 44.17, 44.18, 44.27, 47.1, 53.1, 93, 94, 97

(56) References Cited

U.S. PATENT DOCUMENTS 5,465,241 A * 11/1995 Narahara ................. 369/44.11
5,524,105 A     6/1996  Brewen et al.
5,825,740 A    10/1998  Kahlman et al.

OTHER PUBLICATIONS

PCT International Search Report for PCT/US 02/07428, mailed Nov. 13, 2002.

* cited by examiner

Primary Examiner—Muhammad Edun
(74) Attorney, Agent, or Firm—Eric D. Levinson (57) ABSTRACT

A method and apparatus for optical tracking in an edge-guided tape recorder is provided. In one embodiment, an optical tape guiding system for use in an optical tape drive which may write to optical tape is provided. The optical tape has a first edge and is disposed to be transported through the optical tape drive, and the optical tape exhibits transverse motion during transport through the optical tape drive. The system includes a curved edge guide disposed to maintain contact with the first edge of the optical tape during transport through the optical tape drive. The system may further include a mirror galvanometer disposed to direct a record beam of the optical tape system to the optical tape.

23 Claims, 7 Drawing Sheets

METHOD AND APPARATUS FOR OPTICAL TRACKING IN AN EDGE-GUIDED TAPE RECORDER

This application claims the benefit of Provisional Application No. 60/274,439, filed Mar. 9, 2001.

BACKGROUND OF THE INVENTION

1. Field of the Invention

This invention relates to tape media technology, and more specifically, to positioning within an optical tape recorder.

2. Description of the Related Art

Optical Tape Recording Systems are now built according to two generic types that involve either scanning across the tape media width (optical recording) or simple non-scanning means of recording data tracks in the long tape direction (linear recording). Various linear recording techniques have been proposed for recording multiple parallel tracks along the tape parallel to the tape edge. In these linear recording designs, the optical recording media can be pre-formatted and the system is designed to record and then playback recorded signals while following a previously written track mark.

Optical recording typically employs a sub-micron track width, and designs commonly necessitate a large number of closely spaced tracks. With tens of thousands of microscopic tracks per inch of media, pre-formatting of optical tape is a difficult and burdensome process. Pre-formatting optical media usually requires the fabrication of specialized equipment specifically designed for that purpose. Designing and building an optical media pre-formatter is often more difficult than producing the optical tape recorder itself. Due to the difficulty of implementing pre-formatted tracks on optical tape media, a system compatible with non-formatted media would be a preferred means of recording.

Earlier optical tracking systems deal with these problems regarding the reading of recorded signals by incorporating the use of a servo system that detects and follows the written track. Designing a practical optical tracking mechanism able to follow such dynamic motion is problematic (e.g., mechanical systems capable of a millimeter motion and frequencies of up to 10 KHz are difficult or impossible to implement). Systems have been designed that follow large motions at low frequencies, or that follow small motions at high frequencies. However, the desired servo system should follow essentially all amplitudes at essentially all frequencies and allow track following to within about 0.2 microns of the track center. The stacking of two servo systems, one on top of the other, (e.g., large amplitude and low frequency with small amplitude and high frequency) is possible but difficult.

In addition, another advantage of optical tape systems is that the small width of the written track enables many tracks to be placed on the same section of media providing high recording capacity, however new tracks must not overwrite previously written tracks. This may not create a problem with pre-recorded media, but for unrecorded media the transverse tape motion prohibits adjacent tracks from being closely spaced unless some design solution is implemented to allow this.

SUMMARY OF THE INVENTION

A method and apparatus for optical tracking in an edge-guided tape recorder is provided. In one embodiment, an optical tape guiding system for use in an optical tape drive which may write to optical tape is provided. The optical tape has a first edge and is disposed to be transported through the optical tape drive, and the optical tape exhibits transverse motion during transport through the optical tape drive. The system includes a curved edge guide disposed to maintain contact with the first edge of the optical tape during transport through the optical tape drive. The system may further include a mirror galvanometer disposed to direct a record beam of the optical tape system to the optical tape.

BRIEF DESCRIPTION OF THE DRAWINGS

The invention may best be understood by referring to the following description and accompanying drawings that are used to illustrate embodiments of the invention. In the drawings.

DETAILED DESCRIPTION

A method and apparatus for optical tracking in an edge-guided tape recorder is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Additionally, reference to an object being coupled to another object indicates that some linkage between the two objects exists, but that direct attachment from one object to another object, or connection of one object through a single third object to another object need not be the only way in which coupling may occur. For example, if a first object is attached to a second object, which in turn is attached to a third object, which is further attached to a fourth object, the fourth object may be said to be coupled to the first object.

The present method and apparatus, in one embodiment, is an optical tape recorder that constrains the transverse position of moving optical tape media to within about two microns by means of a contact edge guide, thereby positioning the desired write or read beam locations to an accuracy of about two microns. Furthermore, a servo controlled optical mirror galvanometer is provided that enables the system to playback data recorded on nominally 0.5 micron wide data tracks by optically following the residual tape transverse motions at high frequency (~6 KHz.) to an accuracy of about 0.01 microns over the two micron range of motion. With an edge guide limiting the transverse tape motion, the large amplitude positioning actuator can be an open loop device, such as a stepper motor or linear motor positioning actuator for example.

Due to the difficulty of implementing pre-formatted tracks on optical tape media, a system compatible with non-formatted media would be a useful means of recording. Designing such a system can be viewed as solving two problems: 1) playback (reading) of recorded tracks; 2) writing the first and successive tracks.

In one embodiment, a partial solution to the problem of reading recorded signals may be to implement an active optical tracking system that follows a previously written track only on playback. This may be implemented with a servo system that detects and follows the written track. For such a system to operate, the optical servo system should be of sufficient performance to accommodate the dynamic motions of the tape as it is being transported in the system; i.e. the servo system should have the ability to follow a given track over the range of transverse motion. The servo design should accommodate essentially all amplitudes and frequencies existing in the tape motion. Depending on the design of the tape transport and the media physical parameters, free spooling tape can typically have low frequency motion with amplitudes of up to a millimeter, and small amplitude motion (e.g. about a micron), at frequencies of up to about 10 KHz. Designing a practical optical tracking mechanism able to follow such dynamic motion is problematic as mechanical systems capable of millimeter motion and frequencies of up to 10 KHz are difficult or impossible to implement.

Obviously, systems can be designed that follow large motions at low frequencies, or that follow small motions at high frequencies. However, the desired servo system should follow essentially all amplitudes at essentially all frequencies and allow track following to within about 0.2 microns of the track center. Stacking or otherwise combining two servo systems, one on top of the other, (e.g. large amplitude and low frequency+small amplitude and high frequency), is possible but difficult. With an edge guide limiting the transverse tape motion, the large amplitude positioning actuator may be implemented as an open loop device, such as a stepper motor driven positioning actuator for example, that simply places the range of the high frequency servo tracking system in the appropriate position.

The second issue in optical tape systems is that the small width of the written track enables many tracks to be placed on the same section of media providing high recording capacity, however new tracks must not overwrite previously written tracks. Obviously this is not a problem with pre-recorded media, but for unrecorded media the transverse tape motion prohibits adjacent tracks from being closely spaced unless some design solution is implemented to allow this. One solution is to limit the range of transverse tape motion by means of a physical tape edge guide and to write all recorded tracks in a known location by means of an open loop positioning actuator of greater precision than the required track spacing. Exact passive transverse position control of a tape to within a small fraction of a bit-track is not possible with high speed longitudinal tape motion, so such a system also preferably involves implementing an optical tracking system that provides the desired frequency response over the now limited range of tape motion. The optical tracking system can be based on any means of deflecting light, e.g. acousto-optic or electro-optic. One embodiment uses a mirror attached to a galvanometer.

Figure 1:
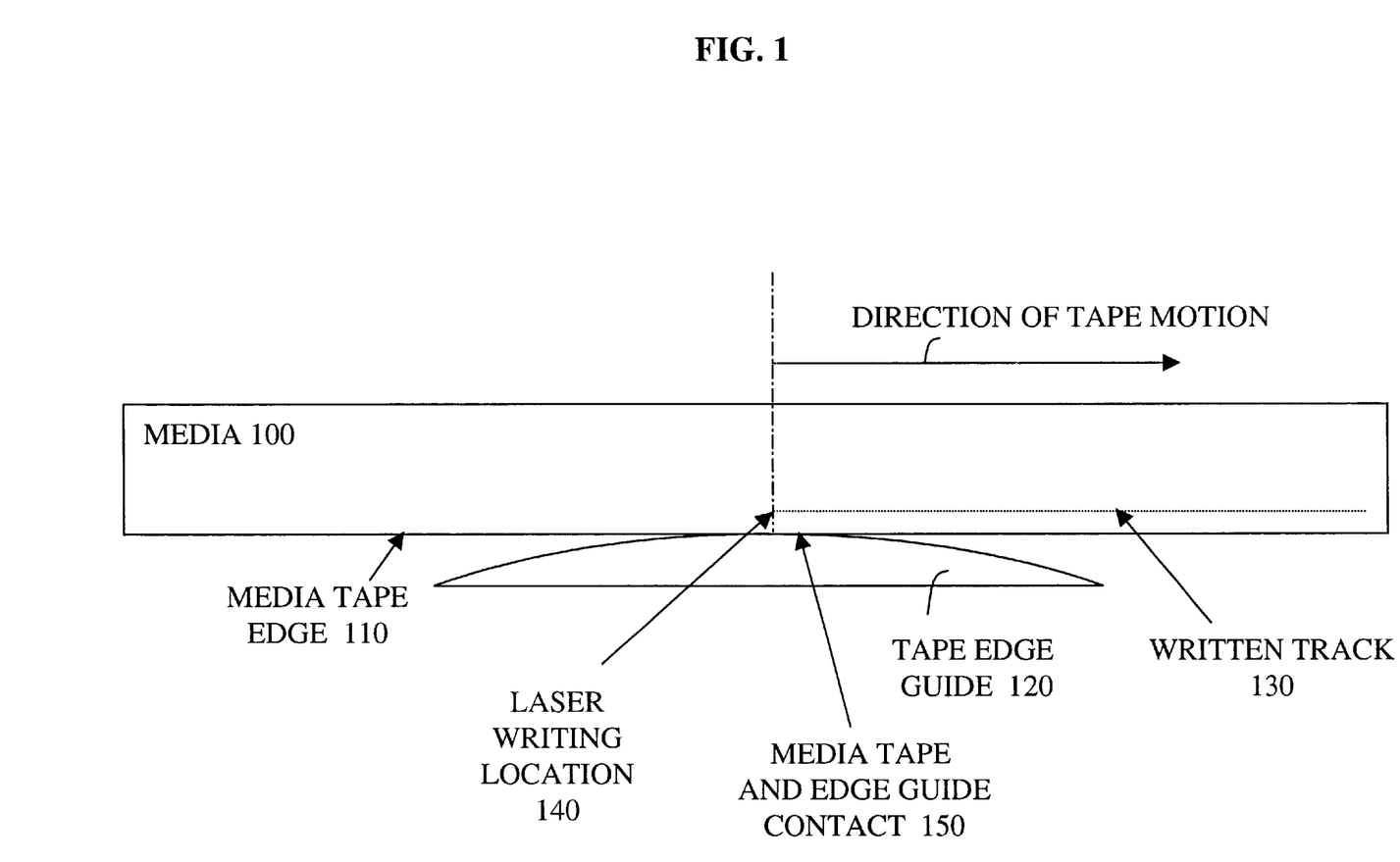
FIG. 1 illustrates the functional relationship between media 100 and a tape edge guide 120 without any defects present, according to one embodiment of the invention.

FIG. 1 is a diagram showing the functional relationship between media 100 and a tape edge guide 120 without any defects present, according to one embodiment of the invention. This figure is used to show one approach in which media tape edge 110 is transported over a tape edge guide 120 at various speeds (e.g., up to several tens of meters per second), while the transverse tape motion is limited by the media 100 remaining in contact with an edge guide 120. In this embodiment, the spectral content of the transverse dynamical motion of the tape is largely determined by the smoothness of the media tape edge 110. The smoothness is often determined by the means by which the media 100 is slit into thin strips from a wider spool. The typical media tape edge 110 quality of commercial magnetic recording media offers edge roughness in the range of a few tenths of a micron, or less. This edge roughness is present over relatively long sections of media 100 in which there is contact between the media tape 100 and the tape edge guide 150. For perfectly smooth tape media edges 110 a written track on the tape 130, which is often generated by a laser system that is fixed with respect to the tape edge guide 120 and focuses on the media, follows a smooth path exactly parallel to the media tape edge 110 that is guided. The written track (or line) 130 is generally not perfectly straight due to tape weave. Small discontinuities in the tape edge smoothness, or debris on the guided tape edge passing over the edge guide 120, will cause abrupt motion of the tape in the transverse direction, effectively causing the written track 130 to abruptly deviate from a smooth line. The dynamics of the written spot as witnessed on playback by a laser writing system at the laser writing location 140 depends on the tape speed, the size of the defect and/or debris of the media tape edge 110 and the contour shape of the edge guide over which the tape passes.

Figure 2:
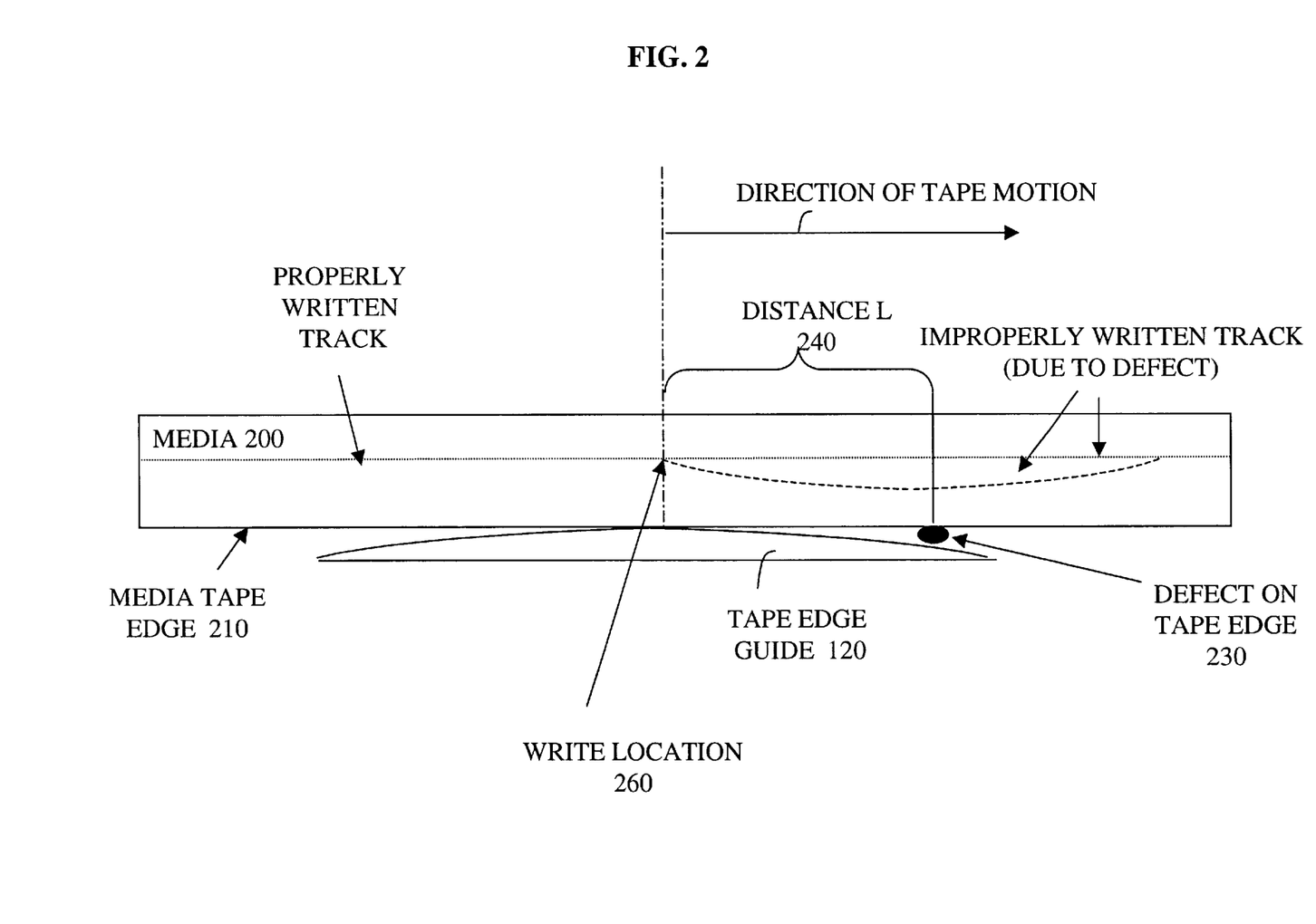
FIG. 2 illustrates the functional relationship between media 200 and a tape edge guide 220 with a defect present, according to one embodiment of the invention.

FIG. 2 is a diagram showing the functional relationship between media 200 and a tape edge guide 220 with a defect present. More specifically, this figure shows one embodiment of the invention in which the tape motion resulting from a one-micron defect and/or debris 230 on the media tape edge 210, passing over a circular tape edge guide 220 at a speed of about ten meters per second. The one-micron perturbation impacts the tape edge guide 220 at a distance L 240 from the media tape and edge guide contact point 250. This causes the media tape edge 210 to nominally rise by one micron, assuming the defect and/or debris is not compressed. The tape motion is essentially an impulse of duration 2×(L/10) seconds. For example, a contact distance in which 2L=2 millimeters (mm) causes an impulse of 0.2 milliseconds (ms). If the contact causes a one cycle sinusoidal motion of the media in the transverse direction, then the associated frequency is 5 Kilohertz (KHz).

For a given size defect and/or debris on the tape edge 230, a larger edge guide radius of curvature will increase the time of contact, thereby lengthening the impulse and reducing the transverse acceleration rate of the media 200. A larger radius edge guide therefore reduces the servo system bandwidth necessary to track such disturbances. The effect of smaller (larger) defect and/or debris sizes on the tape edge 230 is to reduce (increase) both the transverse tape motion and the duration of the impulse.

The tape media 200 and defect on the tape edge 230 should be controlled so that in the event of a change in either the edge quality or edge debris parameters between writing a track at a track write location 260, the optical servo system (i.e., a galvanometer) will follow the previously written track. This places certain limits on the initial media edge quality, the degree of edge wear that can be allowed, and the amount of debris the system can tolerate.

Figure 3:
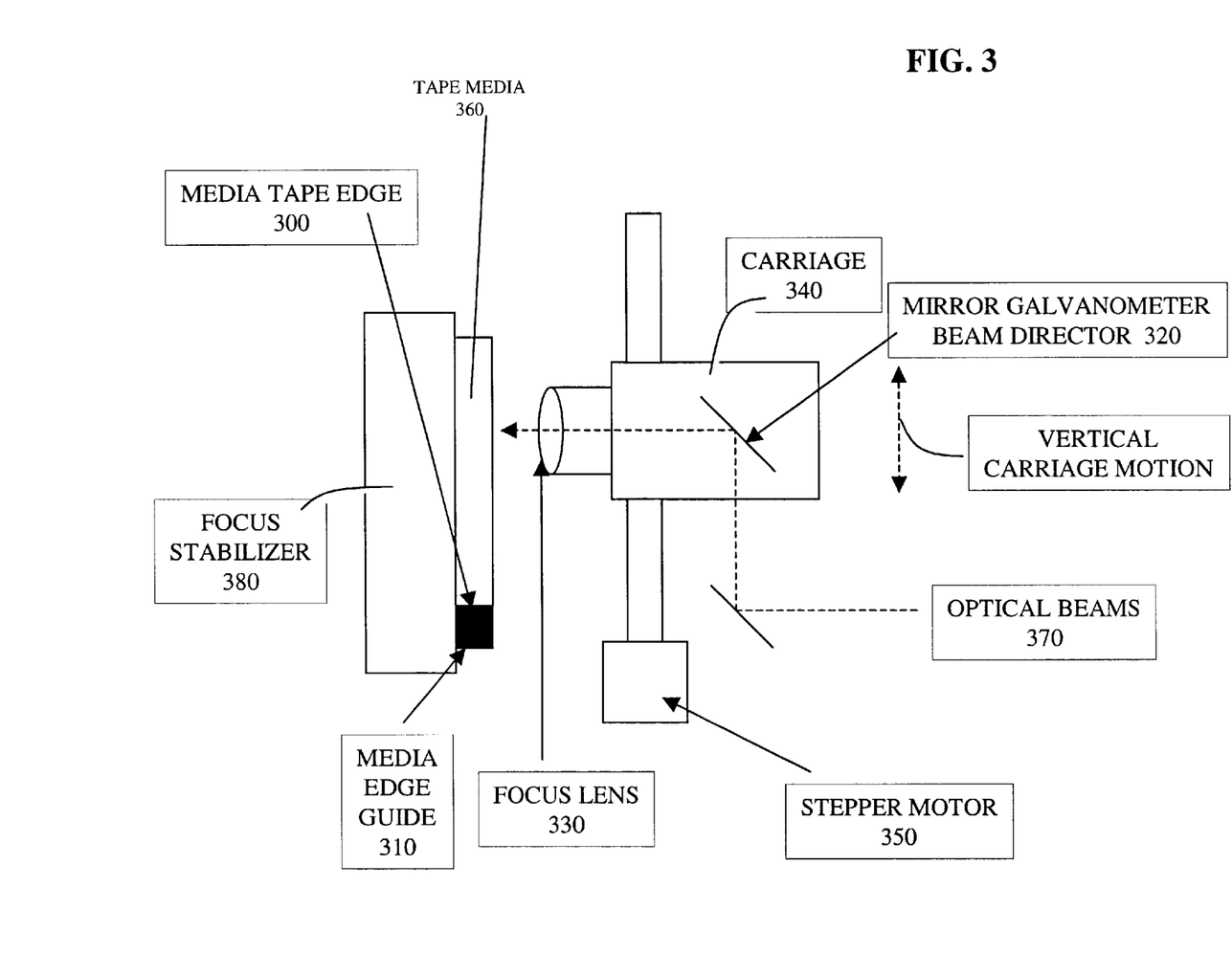
FIG. 3 illustrates a cross-sectional view of the media tape guide system, according to one embodiment of the invention.

FIG. 3 is a cross-sectional view of the media tape guide system, according to one embodiment of the invention. This figure shows a tape transport system in which the media tape edge 300 is constrained against an edge guide 310, thereby (1) limiting the range of possible transverse motion, and (2) incorporating a mirror galvanometer beam director 320 that is capable of high frequency motion over small amplitudes. A focus stabilizer 380 is commonly used to maintain the media tape and its tape edge 300 in a constant position for the rest of the system to operate properly. The galvanometer director 320 is servo-controlled via feedback signals from the recording media. To write a series of tracks in various positions across the media width, the galvanometer 320 and objective (focus) lens 330 are mounted on a carriage 340 that may be positioned by a stepper motor 350 driven system to enable access to the entire width of the media 360.

For example, access across half-inch wide tape media (12,700 microns) 360 for a series of data track groups, each group of a total width of 20 microns, is accomplished by positioning the moving carriage 340 assembly into one of at least 635 locations, each 20 microns apart. In common practice, the carriage 340 is positioned to a much greater accuracy, perhaps within a micron or two across the entire width of the tape media 360, thereby allowing the optical beams 370 to be nominally on axis and centered in the aperture of the objective lens. In one embodiment, a stepper motor with step of approximately 1 micron is used to position the carriage 340.

The basic edge guide approach is based on the premise that the use of a media edge guide 310 will limit the transverse tape motion to within a specific bound so that differences in the motion on repeated passes can be compensated for by an optical track following system. The track following system operates via a closed-loop servo that positions the optical beams 370 onto the tape media 360 in the desired location by means of the mirror galvanometer 320. Due to variations in the media tape edge 300 that occur over the media lifetime, an optical write/read point fixed, although nominally fixed in relation to the media transport system, only provides an approximately repeatable path on the media. Variations in the height at which the tape pack originates cause a rotational motion with the crown of the edge guide 310 as a fulcrum, causing a variation in the written path dependent on the pack height variation. The edge weave pattern arising due to slitting also causes the media path to deviate from a straight line, although only variations from a previously written track path are relevant. The amplitude and bandwidth response of the galvanometer servo system must be designed to accommodate the total transverse position non-repeatability in the media path arising from the totality of these causes. The non-repeatable tape motion in the focus direction is compensated for by a servo driven focus actuator. The transverse position non-repeatability in the media path is due to three effects (1) protrusions and debris or edge imperfections whose presence changes with time, (2) non-repeatability in the bulk media motion due to media vibration and (3) effects due to variation in the tape pack height.

In the first circumstance (where protrusions and debris is present), change can occur to the media tape edge 300 on each traverse. Such changes to the media tape edge 300 can take the forms of protrusions or indentations potentially being modified or removed, debris being removed, debris being added or simply moved to a new location. Media vibration effects are assumed to be random, and the variation in pack height has both 'once around' and 'rewind' variations. In the circumstance where a written track is being perfectly followed with the optical tracking beam 370 centered on the track, the addition or removal of debris will cause a variance in the tape path with characteristics due to the size of the debris and the curvature of the edge guide. Path changes due to debris of a size less than a typical tracking bound of 0.4 microns will not necessitate a tracking servo response, although a small response will occur. Consideration must be given to a system where media path changes in excess of 0.4 microns occur, and the system tracking bandwidth is limited in response (for example) to about 6 KHz. Assuming a circular edge guide profile, a debris change will cause a response in the media path with a period proportional to the edge guide radius. The system limit is reached when a 0.4 micron sized debris particle causes a response of ⅙ millisecond. Debris larger than this may cause a longer period response; while debris smaller than this may not cause loss of tracking or data. The edge guide radius should therefore be longer than that which causes a 0.4 micron motion in the distance that an artifact travels in ⅙ milliseconds at the desired media velocity. For example, at a media velocity of 10 meters/sec. the media travels 1.666 millimeters in ⅙ milliseconds. The corresponding smallest edge guide radius that permits track following is that which curves 0.4 microns in half this distance.

Figure 4:
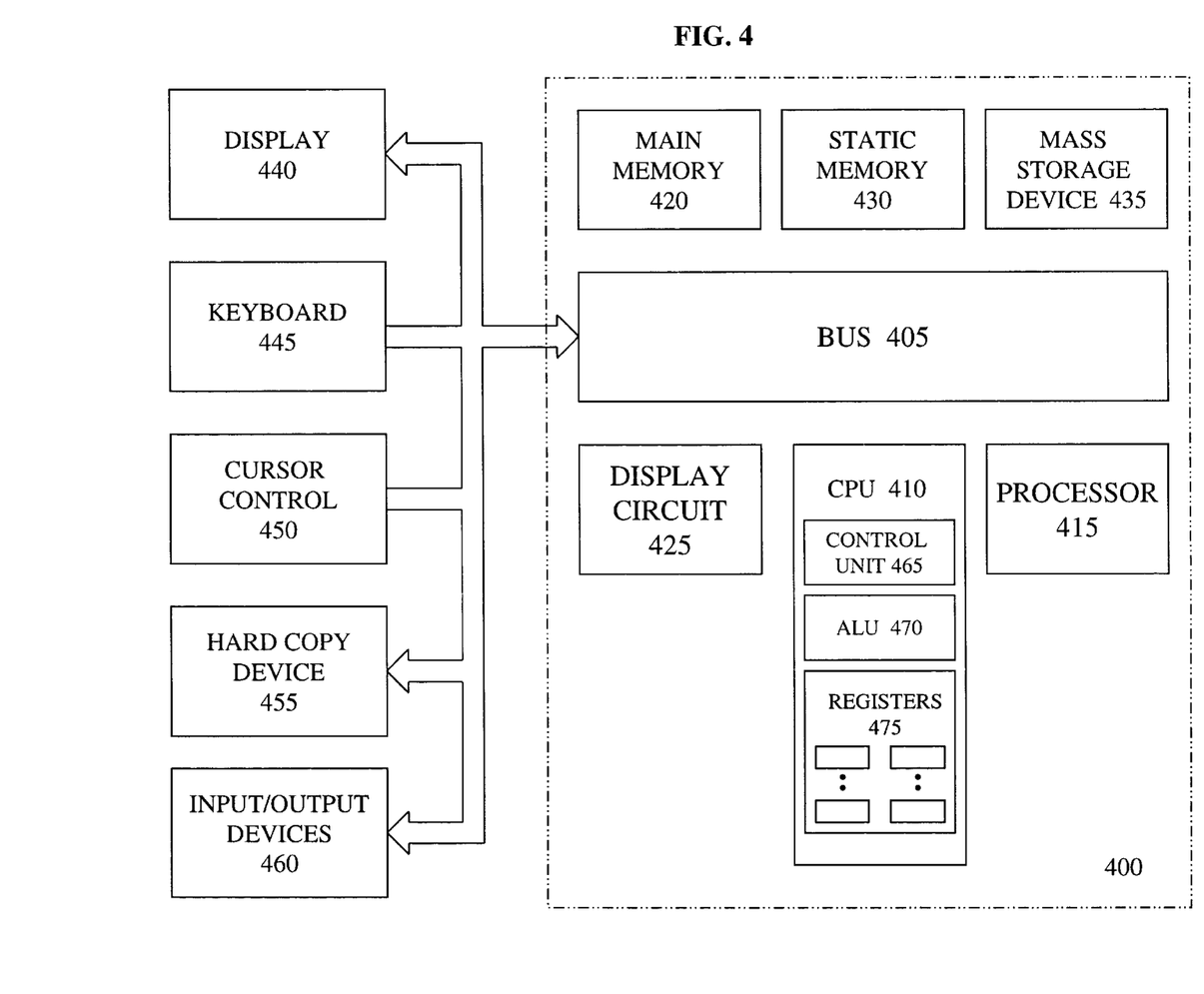
FIG. 4 illustrates an exemplary conventional digital processing system 400 in which some embodiments of the present invention can be implemented.

FIG. 4 depicts an exemplary conventional digital processing system 400 in which some embodiments of the present invention can be implemented. Referring to FIG. 4, digital processing system 400 includes a bus 405 or other communication means for communicating information, and a central processing unit (CPU) 410 coupled with bus 405 for processing information. CPU 410 includes a control unit 465, an arithmetic logic unit (ALU) 470, and several registers 475. For example, registers 475 may include predicate registers, spill and fill registers, floating point registers, integer registers, general registers, and other like registers.

Digital processing system 400 also includes a main memory 420, which may be a random access memory (RAM) or some other dynamic storage device, which is coupled to bus 405. Main memory 420 may store information and instructions to be executed by CPU 410. Digital processing system 400 also includes a static memory 430 such as, for example, a read only memory (ROM) and/or other static storage device, that is coupled to bus 405 for storing static information and instructions for CPU 410. A mass storage device 435, which may be a hard or floppy disk drive, can also be coupled to bus 405 for storing information and instructions.

A display 440, such as a cathode ray tube (CRT), can be coupled to bus 405. Display device 440 is used to display information to a computer user. A keyboard 445 or other alphanumeric input device may also be coupled to bus 405 for communicating information and command selections to CPU 410. A cursor control 450, such as a mouse, a track ball, or cursor direction keys, may be coupled to bus 405 for communicating direction information and command selections to CPU 410 and for controlling cursor movement on display 440. Another device that may be coupled to bus 405 is hard copy device 455 which may be used for printing instructions, data, or other information on paper, film, or some other storage medium.

A number of input/output devices 460 may also be coupled to bus 405. In particular, a tape drive such as an optical tape drive may be coupled to the bus 405. The tape drive may include the edge-guide system discussed herein.

Figure 5:
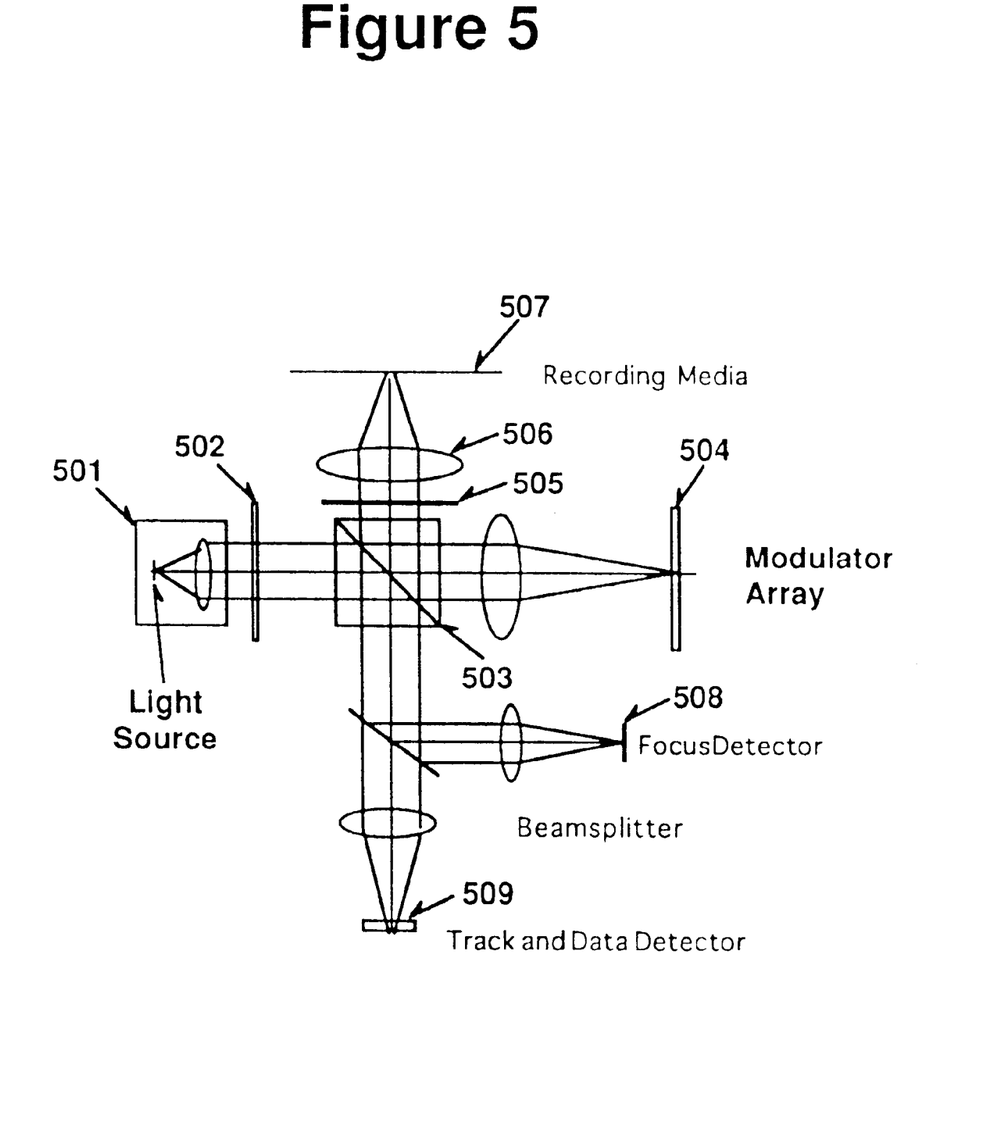
FIG. 5 illustrates an embodiment of an optical tape drive.

FIG. 5 shows an example of an optical recording system (an optical tape drive) having a two-dimensional array using the reflective mode. A light source 501 produces a collimated light beam which is sent through hololgram 502. The multiple beams of the beam array generated by hologram 502 pass through beamsplitter 503 and are modulated by the modulator array 504. In the reflective mode, the reflective PLZT modulator array 504 acts as a quarter wave plate when voltage is applied. The linearly polarized beams input through the polarizing beamsplitter 503 return from the reflective modulator array 504 and are input to the recording media 507 via quarter wave plate 505 and objective lens 506. On readback, the image from the illuminated media surface 507 is passed through the beamsplitter 503 to the focus and data detectors 508 and 509.

While not illustrated in FIG. 5, the curved edge guide may be located such that it maintains contact with one edge of media 507, with the focus stabilizer located in back of media 507 relative to quarter wave plate 505. The mirror galvanometer and fold mirror may be placed in the optical path between media 507 and quarter wave plate 505, such that the beams from quarter wave plate 505 are incident on the fold mirror, then on the mirror galvanometer, and then on objective lens 506. As will be appreciated, this may be implemented without significantly changing the optical nature of the embodiment illustrated in FIG. 5. Furthermore, it will be appreciated that other locations within the system may be appropriate for these components, such as placement of the fold mirror and mirror galvanometer between the quarter wave plate 505 and beamsplitter 503 for example. Additionally, it will be appreciated that in one embodiment, track and data detector 509 detects whether the track is moving away from the read beam(s) and generates signals which may either be sent directly to the servo of the galvanometer and stepper motor actuator or may result in signals sent to the servo of the galvanometer and stepper motor actuator, allowing for the fine and coarse positioning adjustments responsive to these signals. Motion in fine or coarse increments may correspond to fine and coarse positioning adjustments, wherein the ratio between the fine and coarse increments may be expected to be similar to the 100:1 ratio described for the motions of the servo and the stepper motor.

Figure 6:
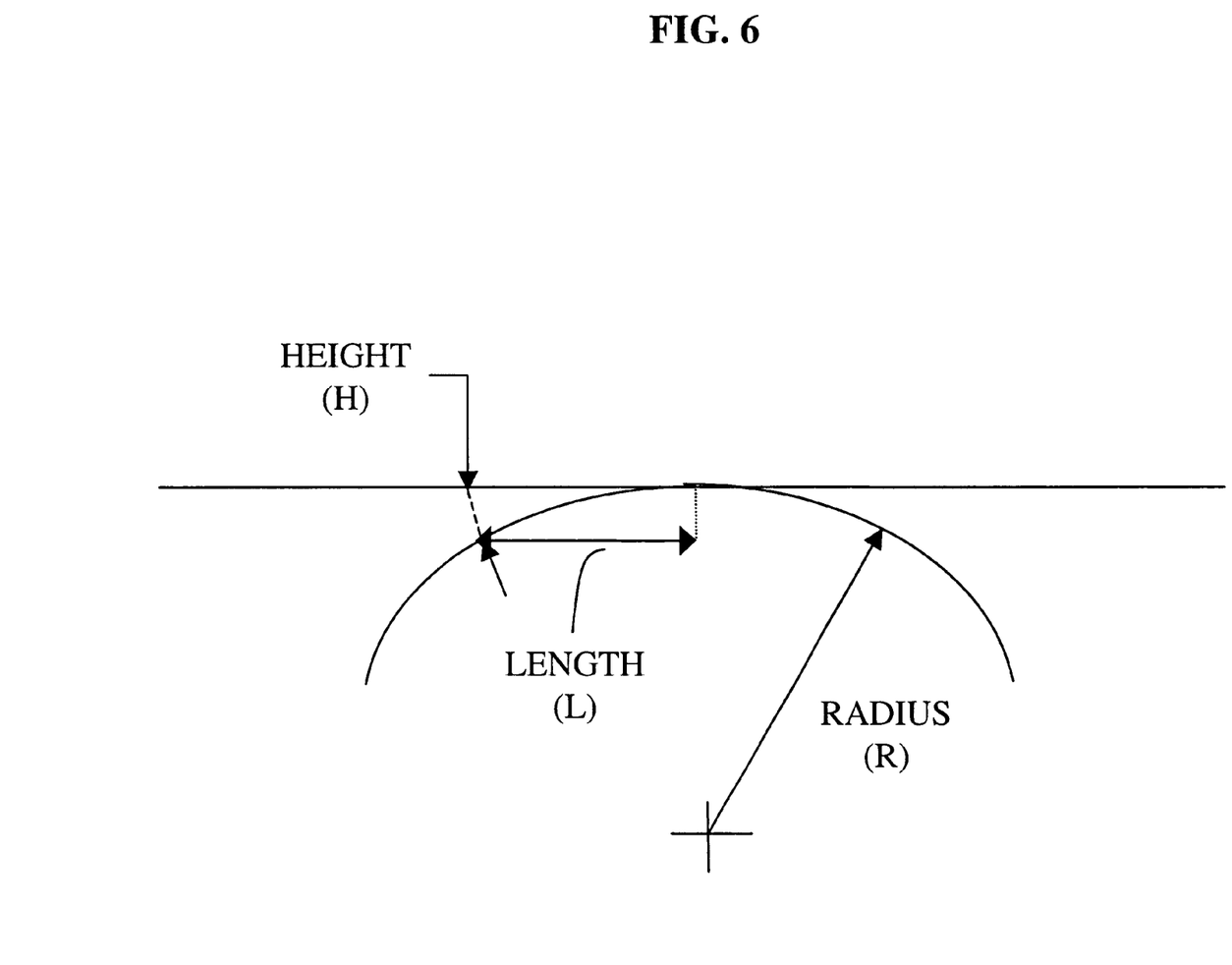
FIG. 6 illustrates the relationship between various parameters used in some embodiments of the present invention.

FIG. 6 illustrates the relationship between various parameters used in some embodiments of the invention. The height (h) is the distance from the edge guide to the tape caused by debris. The length (L) is the length from the point at which the height (h) is measured to the (approximate) tangential point of contact between the tape and the edge guide. The radius (R) is the radius of curvature of the edge guide.

Small deviations from a straight path for a circular edge (i.e., the value of h is small in comparison with the values of L and R), are approximated by applying the formula: $L^2=2Rh$. The value of R is determined by finding the edge guide radius, the value of h is the debris diameter, and the value of L used in this equation is the distance that the media travels in a half period of the induced motion. For instance, if the value of $h=0.4\times10^{-3}$ mm, and $L=\frac{1}{2}\times1.67$ mm, we calculate R to equal 868 mm. Approximating this to a radius of one meter, we can calculate the frequency associated with this one meter radius, and the contact length on the edge guide for a given particle size.

| Particle Diameter (microns) | 0.2 | 0.4 | 0.5 | 0.6 | 0.8 | 1.0 | 1.5 | 2.0 | 5.0 |
|---|---|---|---|---|---|---|---|---|---|
| Frequency (KHz) | 7.94 | 5.62 | 5.00 | 4.57 | 3.95 | 3.53 | 2.89 | 2.50 | 1.58 |
| Contact Length (2L) in mm. | 1.26 | 1.78 | 2.00 | 2.19 | 2.53 | 2.83 | 3.46 | 4.00 | 6.32 |
| Servo Required? | No | Yes | Yes | Yes | Yes | Yes | Yes | Yes | Yes |

It may be understood that a system with the media traveling at 10 meters/sec., at 6 KHz tracking servo bandwidth, and an edge guide radius of one meter, should be able to follow path motion changes due to the addition or removal of debris of any anticipated size. It is assumed that for small debris particles the pressure on the particle is sufficient to force the particle to partially embed itself into the media, hence particles of several microns size may only have an effective size of half a micron. The embedding process will also reduce the acceleration of the media, perhaps by half or more. The system will not be able to follow a written track for particles or debris of 'unreasonable' size, i.e. so large that the track excursion is beyond the range that the servo can follow.

The force necessary to maintain the media in contact with the edge guide is also calculable. For sinusoidal motion of amplitude x the acceleration is sinusoidal and is $\ddot{x}=-\omega^2 x$, where $\omega=2\pi f$ and f is the frequency of oscillation. For all the frequencies and amplitudes listed above the calculated acceleration is about 495 m/sec.$^2$, or about 50 g ($g=9.8$ m/s$^2$). The force to move a 40 mm length of media of density 1.3 gms/cc., is given by $F=ma$, where the mass is $m=4\times1.27\times0.012\times1.3=0.08$ gms. This also holds for a total length of 80 mm (~0.16 grams), moved on average half the peak height. Hence we estimate $F=\frac{1}{2}\times0.16\times50=4$ grams force. A spring system capable of holding the media on the edge guide must therefore apply a force of greater than 4 grams and have a resonant frequency greater than about 5.6 KHz. to avoid spring lift-off as a disturbance passes the crown of the edge guide.

Figure 7:
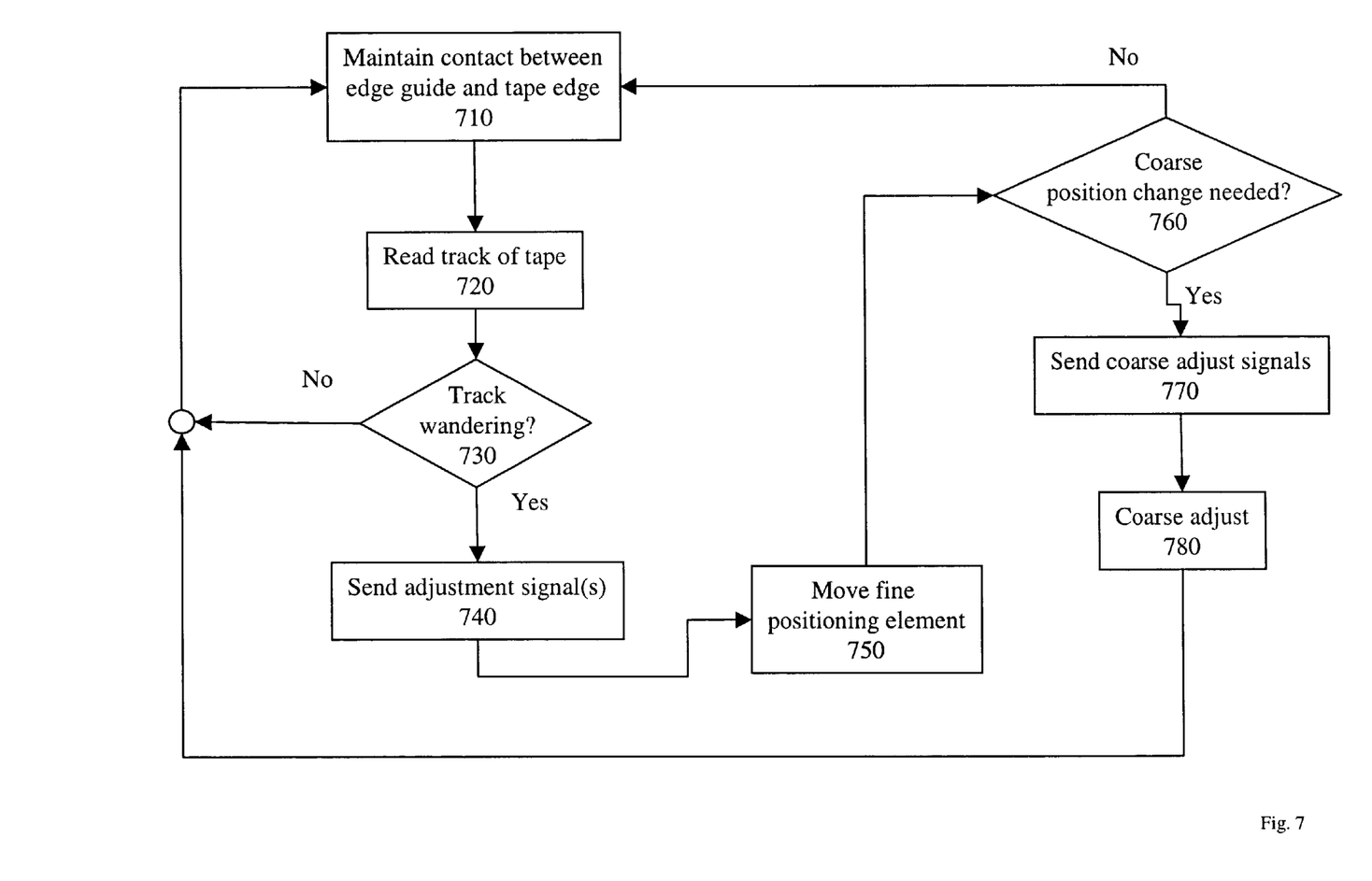
FIG. 7 illustrates an embodiment of a method of focusing a beam on an optical tape.

Turning to FIG. 7, an embodiment of a method of focusing a beam on an optical tape is illustrated. At block 710, contact between an edge of an optical tape and a curved edge guide is maintained. At block 720, a track of the optical tape is read, using a read beam. At block 730, a determination is made as to whether the track has moved from the position of the read beam (such as through focus detection or other tracking). At block 740, if the track has moved, a signal or set of signals is sent to a fine positioning element. At block 750, the fine positioning element is moved (or moves) responsive to the signals. Note that the fine positioning element may be the mirror galvanometer mentioned previously, and movement of the read beam (and any other corresponding beams) may be expected to occur in fine increments.

At block 760, a determination is made as to whether coarse adjustment is necessary. Coarse adjustment normally involves moving the beam or beams to tracks in another portion of the tape. At block 770, if coarse adjustment is necessary, a second signal or second set of signals is sent to a coarse positioning element. At block 780, the coarse positioning element moves the fine positioning element responsive to the second signal or second set of signals. In one embodiment, the coarse positioning element is a stepper motor which steps responsive to the signals, thereby moving the fine positioning element and corresponding beams to tracks in a different portion or section of the tape. After block 780, the process returns to block 710, as it would at blocks 730 or 760 if a determination is made that no adjustment is needed.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 4 may be integrated into components, or may be subdivided into components. Similarly, FIG. 7 illustrates a method which may be reordered or rearranged in a parallel fashion for example. The present specification and figures are accordingly to be regarded as illustrative rather than restrictive.

What is claimed is:

1. An optical tape guiding system for use in an optical tape drive which may write to optical tape, the optical tape disposed to be transported through the optical tape drive, the optical tape exhibiting transverse motion during transport through the optical tape drive, the optical tape having a first edge, comprising:

a curved edge guide disposed to maintain contact with the first edge of the optical tape during transport through the optical tape drive.

2. The optical tape guiding system of claim 1 further comprising:

a mirror galvanometer disposed to direct a record beam of the optical tape system to the optical tape.

3. The optical tape guiding system of claim 2 further comprising:

an optical feedback servo system coupled to the mirror galvanometer, the optical feedback servo system disposed to receive signals from the optical tape drive system, and the optical feedback servo system to move the mirror galvanometer;

and wherein the mirror galvanometer disposed to move responsive to the optical feedback servo system and to alter an optical path of the record beam responsive to the signals of the optical tape drive system.

4. The optical tape guiding system of claim 3 further comprising:

a stepper motor and associated driver, the stepper motor disposed to move the mirror galvanometer coarsely responsive to signals from the optical tape drive; and wherein:

the optical tape drive to receive the feedback signals from the optical tape through a read beam, the optical tape drive to generate signals for the optical feedback servo system responsive to the feedback signals of the read beam, the read beam to reflect from the mirror galvanometer.

5. An optical tape guide system suitable for use in an optical tape drive, the optical tape drive to receive optical tape and transport optical tape through the optical tape drive, the optical tape drive to read from and write to the optical tape, the optical tape having a first edge and a first side, comprising:

a curved edge guide disposed to maintain contact with the first edge of the optical tape; and a focus stabilizer coupled to the curved edge guide, the focus stabilizer to maintain proximity to the first side of the optical tape.

6. The optical tape guide system of claim 5 further comprising:

a mirror galvanometer disposed to receive a beam from the optical tape drive and direct the beam to a portion of the optical tape, the minor galvanometer housed in a carriage, the carriage coupled to a servo, the servo to move the mirror galvanometer in fine increments responsive to signals from the optical tape drive system.

7. The optical tape guide system of claim 6, further comprising:

a stepper motor coupled to the carriage, the stepper motor to move the carriage in coarse increments responsive to signals from the optical tape drive.

8. The optical tape guide system of claim 7 further comprising:

a focus lens coupled to the carriage, the focus lens disposed to receive the beam from the mirror galvanometer, the focus lens to focus the beam on the optical tape, the focus lens disposed to move with the carriage.

9. The optical tape guide system of claim 6, further comprising:

a focus lens attached to the carriage, the focus lens disposed to receive the beam from the mirror galvanometer, the focus lens disposed to focus the beam on the optical tape.

10. The optical tape guide system of claim 5 further comprising:

a mirror galvanometer disposed to receive a beam from the optical tape drive and direct the beam to a portion of the optical tape, the mirror galvanometer housed in a carriage, the carriage coupled to a servo, the servo to move the mirror galvanometer in fine increments responsive to signals from the optical tape drive.

11. The optical tape guide system of claim 10, further comprising:

a stepper motor coupled to the carriage, the stepper motor to move the carriage in coarse increments responsive to signals from the optical tape drive.

12. The optical tape guide system of claim 11 further comprising:

a focus lens coupled to the mirror galvanometer, the focus lens disposed to receive the array of modulated beams from the mirror galvanometer, the focus lens to focus the array of modulated beams on the optical tape.

13. The optical tape system of claim 11 wherein:

coarse increments are approximately 1 micron.

14. The optical tape guide system of claim 10 wherein:

fine increments are approximately 0.01 microns.

15. An optical tape guide system suitable for use in an optical tape drive, the optical tape drive to receive optical tape and transport optical tape through the optical tape drive, the optical tape drive to read from and write to the optical tape, the optical tape having a first edge and a first side, comprising:

a curved edge guide disposed to maintain contact with the first edge of the optical tape;

a focus stabilizer coupled to the curved edge guide, the focus stabilizer to maintain proximity to the first side of the optical tape;

a mirror galvanometer disposed to receive a beam from the optical tape drive and direct the beam to a portion of the optical tape, the mirror galvanometer housed in a carriage, the carriage coupled to a servo, the servo to move the mirror galvanometer in fine increments responsive to signals from the optical tape drive system;

a stepper motor coupled to the carriage, the stepper motor to move the carriage in coarse increments responsive to signals from the optical tape drive; and a focus lens coupled to the mirror galvanometer, the focus lens disposed to receive the beam from the mirror galvanometer, the focus lens to focus the beam on the optical tape.

16. A method of tracking an optical tape having a first edge and a first side through an optical tape drive, comprising:

maintaining contact between the first edge of the optical tape and a curved edge guide;

reading a track of the optical tape using a read beam;

determining when the track passes away from the read beam center;

sending a first set of signals to a fine positioning element responsive to determining when the track passes away, the fine positioning element disposed to pass the read beam to and from the optical tape; and;

moving the fine positioning element responsive to the first set of signals.

17. The method of claim 16 further comprising:

sending a second set of signals to a coarse positioning element; and moving the fine positioning element through use of the coarse positioning element, the coarse positioning element acting responsive to the second set of signals.

18. The method of claim 17 wherein:

the fine positioning element is a mirror galvanometer coupled to a servo, the servo to receive the first set of signals and move the mirror galvanometer.

19. The method of claim 18 wherein:

the course positioning element is a stepper motor coupled to the mirror galvanometer, the stepper motor to step responsive to the second set of signals.

20. The method of claim 19 wherein:

the mirror galvanometer is housed within a carriage, the carriage is attached to the stepper motor.

21. The method of claim 18 wherein:

the coarse positioning element is a linear motor coupled to the mirror galvanometer, the linear motor to step responsive to the second set of signals.

22. An optical tape drive comprising:

a light source;

a beamsplitter disposed to receive a beam of light from the light source, the beamsplitter to split the light beam into an array of light beams;

a modulator array disposed to receive the array of light beams from the beamsplitter, the modulator array disposed to reflectively modulate the array of light beams to produce a modulated array of light beams and to reflect the modulated array of light beams back to the beamsplitter;

a fold mirror disposed to receive the modulated array of light beams from the beamsplitter, the modulated array of light beams passed through the beamsplitter; and a mirror galvanometer disposed to receive the modulated array of light beams from the fold mirror, the mirror galvanometer disposed to reflect the modulated array of light beams toward a focus stabilizer.

23. The optical tape drive of claim 22 further comprising:

a curved edge guide attached to the focus stabilizer, the curved edge guide disposed to maintain contact with an edge of an optical tape during operation of the optical tape drive.

* * * * *